(12) United States Patent
Nakon

(10) Patent No.: US 6,692,709 B2
(45) Date of Patent: Feb. 17, 2004

(54) PREPARATION AND USE OF ORGANIC EXTRACTANT FOR RECOVERY OF METAL IONS FROM AQUEOUS SOLUTIONS

(75) Inventor: David Gregory Nakon, Brisbane (AU)

(73) Assignee: Canopean Pty Ltd, Queensland (AU)

( * ) Notice: Subject to any disclaimer, the term of this patent is extended or adjusted under 35 U.S.C. 154(b) by 164 days.

(21) Appl. No.: 09/905,904

(22) Filed: Jul. 17, 2001

(65) Prior Publication Data

US 2002/0053260 A1 May 9, 2002

(30) Foreign Application Priority Data

Jul. 19, 2000 (AU) ............................................. PQ 8863

(51) Int. Cl.$^7$ ............................. C01B 31/16; C09K 3/00
(52) U.S. Cl. ........................................ 423/157; 252/184
(58) Field of Search ........................ 423/157; 210/634; 252/184

(56) References Cited

U.S. PATENT DOCUMENTS

| | | | |
|---|---|---|---|
| 4,275,038 A | | 6/1981 | Sikdar et al. |
| 4,423,012 A | | 12/1983 | Reynolds et al. |
| 4,521,386 A | * | 6/1985 | Nogueira et al. ........... 423/157 |
| 4,957,714 A | | 9/1990 | Olafson et al. |
| 5,378,262 A | | 1/1995 | Mihaylov et al. |
| 5,779,997 A | | 7/1998 | Nyman et al. |
| 6,054,105 A | | 4/2000 | Jones |

OTHER PUBLICATIONS

Principles and Applications to Process Metallurgy; Chapter 6, pp. 230–236 (Ritcey, G.M., and Ashbrook, A.W.) Elsevier, 1984. No Month.
Some Practical Considerations In The Evaluation and Selection of Solvent Extraction Reagents; Chapter 20, Sudderth, R.B., and Kordosky, G.A., pp. 181–196. No date.

* cited by examiner

Primary Examiner—Steven Bos
(74) Attorney, Agent, or Firm—Dickinson Wright PLLC

(57) ABSTRACT

A process for the extraction of metals from an aqueous solution of metals in the form of their metal ions. The preparation and use of an efficient organic extractant and also the recovery from the organic extractant of the metal ions. A process for preparing an extractant solution where the extractant solution is a solution of a calcium ion or magnesium ion loaded extractant in a water-immiscible organic solvent, and where the extractant solution is suitable for extracting metal ions from an aqueous solution containing the metal ions, including mixing an aqueous solution of calcium ions or magnesium ions with a basic calcium salt or a basic magnesium salt and with a solution of an organic extractant in a water-immiscible organic solvent to form the extractant solution, and then separating the extractant solution from the aqueous solution.

19 Claims, 4 Drawing Sheets

PREPARATION AND USE OF ORGANIC EXTRACTANT FOR RECOVERY OF METAL IONS FROM AQUEOUS SOLUTIONS

This invention relates to a process for the extraction of metals from an aqueous solution of metals in the form of their metal ions. In particular, the invention relates to the preparation and use of an efficient organic extractant and also the recovery from the organic extractant of the metal ions.

BACKGROUND

Many industrial processes lead to the production of water containing one or more metal ions. In particular, the mining industry must deal with metal ion recovery from aqueous solutions. The treatment and disposal of acid mine drainage can be difficult. Acid mine drainage is an aqueous solution containing a variety of metal ions. The solution is often harmful to the environment and also to human health. Acid nine drainage is usually treated to clean the water but standard treatment processes usually lead to the production of mixtures of unwanted solid metal salts which are typically dumped. However, in time, the metal salts contaminate ground water through contact with rainwater and natural seepage.

In a typical solvent extraction process, an aqueous solution of metal ions is contacted with an organic extractant in an organic solvent. The organic solvent is typically a hydrocarbon solvent. The organic extractant typically has an available proton which can exchange with a metal ion from the aqueous solution. Such extractants include organic acids, for example naphthenic acid, and chelation extractants, for example certain hydroxy oximes. The organic acids rely on simple ionic interactions to attract metal ions from the aqueous solution in exchange for protons. The chelation extractants use a chelate effect to bind metal ions in a claw-like manner with concomitant release of protons to the aqueous solution.

The exchange of metal ions to the organic solution and hydrogen ions to the aqueous solution causes the pH of the aqueous solution to lower. In order to maintain the exchange equilibrium and prevent the exchange reaction from coming to a halt, the pH of the aqueous solution must be continually adjusted. This is particularly the case for organic acid extractants. The adjustment is usually made by the addition of ammonia or sodium hydroxide. The pH adjustment can therefore make the extraction process expensive and complex.

Following extraction of the metal ions into the organic solution, the organic solution containing extractant loaded with metal ions is then typically subjected to a stripping process. The standard stripping method involves contacting the organic solution with aqueous acid, such as sulphuric acid or hydrochloric acid, to transfer the metal ions to an aqueous solution leaving reprotonated organic extractant to be recycled for further extraction.

A typical aqueous solution to be treated will contain two or more types of metal ions, depending on the source of the aqueous solution. For example, a solution may contain copper ions and zinc ions in addition to lower concentrations of other metal ions such as nickel, manganese, and iron.

It is desirable to be able to extract the metal ions selectively from the aqueous solution. The selectivity can be controlled to an extent by maintaining the pH in a predetermined range for a particular organic extractant. For example, zinc ions can be extracted from an aqueous solution using di-2-ethylhexylphosphoric acid (D2EHPA) at a pH of approximately 3 without extracting any significant amount of manganese ions which are present in the aqueous solution. The avoidance of any coextraction means that stripping of the organic solution results in an aqueous solution containing only one type of metal ion. The metal can then be recovered in pure form using standing methods such as electrolysis.

U.S. Pat. No. 6,378,262 describes the selective recovery of metals such as nickel and cobalt from solutions additionally containing other metals such as manganese, calcium and magnesium. The process includes maintaining the pH of the aqueous solution between approximately 2 and 6 using a sodium hydroxide solution. The aqueous solution is contacted with a water-immiscible organic solution containing an extractant. Following separation of the aqueous and organic phases, the metal-loaded organic solution is contacted with an aqueous acid strip solution to recover the metal.

U.S. Pat. No. 4,423,012 describes the recovery of manganese and zinc ions from an aqueous solution. The extractant used is di-ethylhexylphosphoric acid (DEHPA). The organic solution of DEHPA is contacted with the aqueous solution of metal ions. Following separation of the aqueous and organic solutions, the organic solution is stripped of metal ions using aqueous acid. The DEHPA can be regenerated using calcium oxide or magnesium oxide. However, mixing times typically between 5 and 10 minutes are required in order to achieve sufficient loading of calcium or magnesium into the organic solution of DEHPA.

U.S. Pat. No. 5,779,997 describes the use of a phosphinic acid extractant. The extractant is firstly converted into its sodium, potassium or ammonium salt using sodium hydroxide, potassium hydroxide or ammonia, respectively. The object is to avoid the addition of sodium, potassium, or ammonium ions into feed solutions causing jarosite to precipitate. The salt of the organic acid is then contacted with a solution of magnesium ions and the magnesium salt of the organic acid is then used to extract cobalt from the feed solution. However, the use of sodium, potassium or ammonium ions is expensive and laborious.

It is therefore an object of this invention to provide a process for recovering metal ions from an aqueous solution using a calcium or magnesium loaded organic extractant, or to at least provide a useful alternative:

It is also an object of this invention to provide a process for preparing a calcium or magnesium loaded organic extractant, or to at least provide a useful alternative.

It is a further object of this invention to provide a solvent extraction process for producing a purified magnesium chloride solution essentially free of calcium ions, from magnesium feedstocks that contain calcium impurities, or to at least provide a useful alternative.

SUMMARY OF INVENTION

In a first aspect of the invention there is provided a process for preparing an extractant solution where the extractant solution is a solution of a calcium ion or magnesium ion loaded extractant in a water-immiscible organic solvent, and where the extractant solution is suitable for extracting metal ions from an aqueous solution containing the metal ions, including the steps:

a) mixing an aqueous solution of calcium ions or magnesium ions with a basic calcium salt or a basic magnesium salt and with a solution of an organic extractant in a water-immiscible organic solvent to form the extractant solution; and b) separating the extractant solution from the aqueous solution.

Preferably the basic calcium salt is calcium oxide (CaO), calcium hydroxide ($Ca(OH)_2$), or calcium carbonate ($CaCO_2$). Preferably the basic magnesium salt is magnesium oxide (MgO), magnesium hydroxide ($Mg(OH)_2$) magnesium carbonate ($MgCO_3$), hydrated magnesium carbonate ($MgCO_3 \cdot xH_2O$), basic magnesium carbonate ($xMgCO_3 \cdot yMg(OH)_2 \cdot zH_2O$), or dolomite ($CaCO_3 \cdot MgCO_3$).

In a preferred embodiment of the invention the extractant solution is a solution of a magnesium ion loaded extractant in a water-immiscible organic solvent. The magnesium may be recovered from this solution by treatment with aqueous hydrochloric acid to give a solution of magnesium chloride which is free of any non-magnesium metal ions.

Preferably the aqueous solution of calcium ions or magnesium ions of step a) is a solution of magnesium chloride. It is also preferred that the solution contains sulphate ions, preferably obtained from magnesium sulphate and/or sulphuric acid.

In a further preferred embodiment of the invention the process also includes the steps:

c) contacting the extractant solution with an aqueous solution containing metal ions to give a solution of the extractant loaded with some or all the metal ions in the organic solvent and to give an aqueous solution containing some or all the calcium ions or magnesium ions; and d) separating the aqueous solution from the solution of the extractant loaded with some or all the metal ions In the organic solvent.

A buffer, such as acetic acid, a mono or diamine, an alkanolamine, or an amino acid, may be used in this invention.

Preferably the organic extractant of this invention is a carboxylic acid, an hydroxy oxime, or an organophosphorous acid.

Examples of carboxylic acids include naphthenic acid, versatic acid, (Z)-9-octadecenoic acid, isostearic acid, 2-octyl-dodecanoic acid, 2-hexyl-decanoic acid, and 2-butyl-octanoic acid. Examples of hydroxy oximes include 2-hydroxy-5-nonylacetophenone oxime, 5-dodecylsalicylaldoxime, and 5-nonylsalicylaldoxime. Examples of organo-phosphorous acids include di-(2-ethylhexyl)phosphoric acid (DEHPA), 2-ethylhexyl phosphonic acid mono-2-ethylhexyl ester (IONQUEST 801), and bis(2,4,4-trimethylpentyl)phosphinic acid (CYANEX 272).

The aqueous solution of calcium ions of step a) of the first aspect of the invention may be formed from calcium chloride ($CaCl_2$) or calcium nitrate ($Ca(NO_3)_2$), whereas the aqueous solution of magnesium ions may be formed from magnesium nitrate ($Mg(NO_2)_2$), magnesium sulphate ($MgSO_4$), or magnesium chloride ($MgCl_2$).

Typically the metal ions which may be extracted using the process of this invention are iron ($Fe^{+2}$ or $Fe^{+3}$), aluminium ($Al^{+3}$), cobalt ($Co^{+2}$), copper ($Cu^{+2}$), mercury ($Hg^{+2}$), nickel ($Ni^{+2}$), zinc ($Zn^{+2}$), manganese ($Mn^{+2}$), lead ($Pb^{+2}$) or cadmium ($Cd^{+2}$) ions, or any mixtures or combinations thereof.

The water-immiscible organic solvent is preferred to be an aliphatic or aromatic hydrocarbon solvent, or mixtures thereof. Preferably the water-immiscible organic solvent is an industrially available high flash point aliphatic and/or aromatic solvent. Examples include Exxsol D80 (aliphatic), Recosol 150 (aromatic) and Shellsol 2046 (aliphatic/aromatic blend).

An another aspect of the invention there is provided an extractant solution loaded with calcium ions or magnesium ions.

BRIEF DESCRIPTION OF THE DRAWINGS

The present invention will become more fully understood from the detailed description given here below, in the appended claims, and in the accompanying drawings in which:

DETAILED DESCRIPTION

Figure 1:
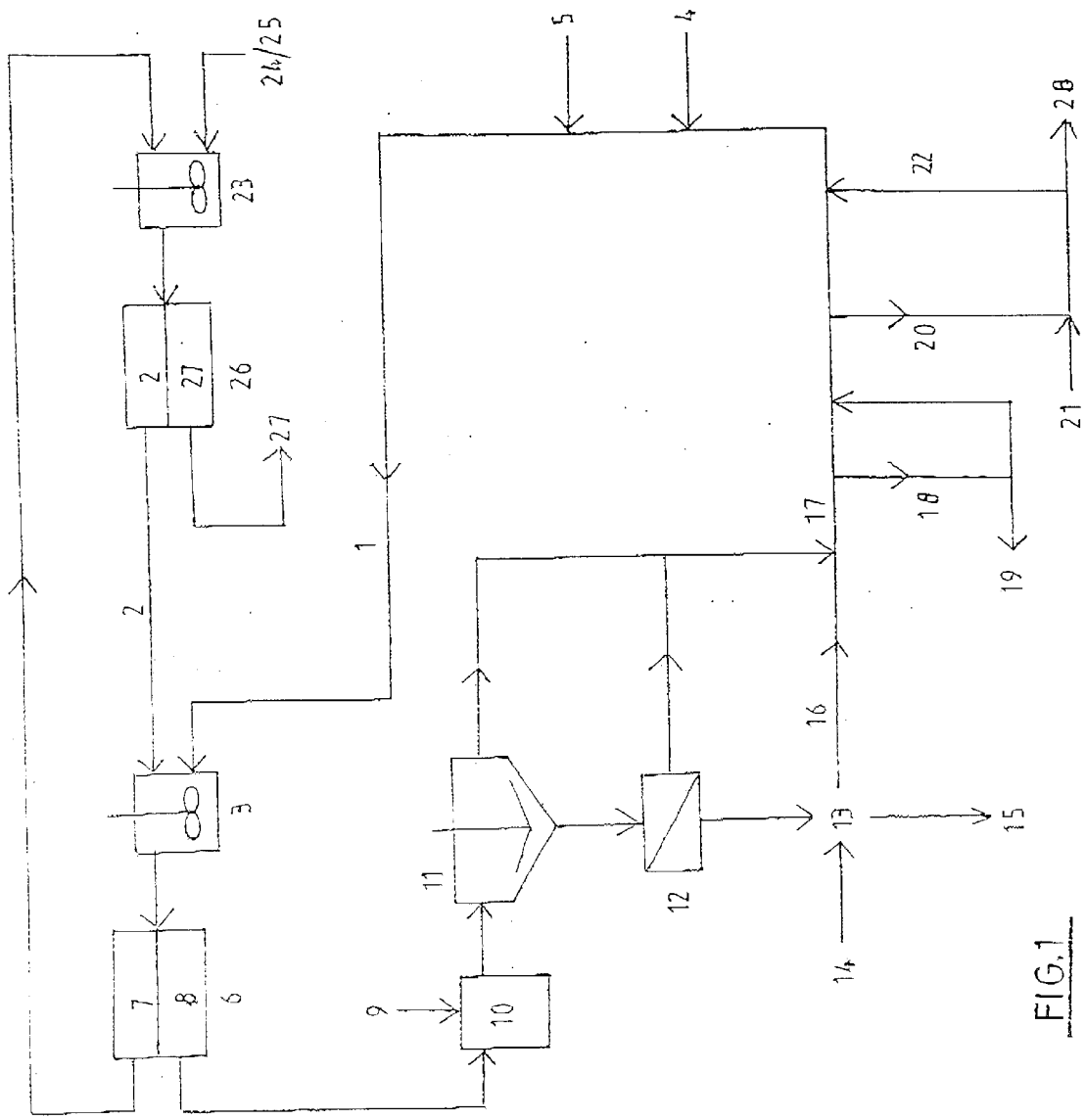
FIG. 1 shows a continuous circuit for the production of purified magnesium chloride solution and/or magnesium chloride hexahydrate solid from basic magnesium carbonate feedstock that contains calcium impurities.

The following description includes processes where calcium is the primary exchangeable cation during the extraction of other metals. However, it is to be appreciated that this invention also relates to magnesium. Thus, any reference to calcium in those processes is to be read as including magnesium as an alternative.

Chelating Extractants

The chelating extractants of this invention are preferably but not limited to the class of hydroxy oximes. In particular, preferred hydroxy oximes are 2-hydroxy-5-nonylacetophenone oxime, 5-dodecylsalicylaidoxime, and 5-nonylsalicylaldoxime, Typically, an extractant, or any mixture of extractants, is dissolved in a suitable hydrocarbon prior to use. Also, the addition of a phase modifier, such as a para-alkylphenol and/or a long chain alcohol, may be preferable. With respect to the loading of calcium into the organic extractant, the addition of a phase modifier is optional, but may act to increase the solubility of the calcium-organic complex in the organic phase. The following organic mixtures are given as examples:

1. 2-Hydroxy-5-nonylacetophenone oxime (commercially available as LIX 84-I from Cognis)/Shellsol 2046 (diluent)/dodecanal (phase modifier).
2. 5-Nonylsalicylaldoxime (commercially available as LIX 860N-I from Cognis)/Shellsol 2046 (diluent).
3. 5-Nonylsalicylaldoxime modified with tridecanol (commercially available as LIX 622N from Cognis)/Shellsol 2046 (diluent).
4. An equivolume mixture of 5-nonylsalicylaldoxime and 2-hydroxy-5-nonylacetophenone oxime (commercially available as LIX 984N from Cognis)/Shellsol 2046 (diluent).
5. 5-Dodecylsalicylaidoxime (commercially available as LIX 860-I from Cognis)/Shellsol 2046 (diluent).

Preparation of Calcium Loaded Chelating Extractants

Chelating extractants are usually available in the hydrogen form. Calcium loading involves the displacement of hydrogen ions from the organic phase, in exchange for calcium ions from the aqueous phase. The extent of calcium loading is adjustable, and can be matched to the particular requirements of the intended application.

Typically, the loading of calcium into hydroxy oxime extractants occurs at basic pH. This is due to the poor affinity for calcium ions by hydroxy oximes relative to that of hydrogen ions. If significant calcium loading is to occur, hydrogen ions released from the organic phase must be neutralised. Maintaining a low activity of hydrogen ions in the aqueous phase is necessary. Two broad methods are utilised for achieving significant calcium loading into hydroxy oximes. These methods are:

A. Contacting the organic phase with an aqueous solution of a calcium salt to which base is added.

B. Contacting the organic phase with an aqueous solution containing a dissolved calcium salt and a buffer, to which base is added.

Method A

The aqueous solution to be contacted with the organic phase may contain dissolved calcium chloride or calcium nitrate, or mixtures of these calcium salts, but it is to be appreciated that the invention is not limited only to the use of these salts.

Typically, the higher the calcium ion activity of the aqueous solution, the lower the equilibrium calcium loading pH will be Advantage is taken of this to maintain a hydrogen ion activity as high as possible throughout the calcium loading process. Therefore, typically very concentrated calcium salt solutions are used, eg 3M $CaCl_2$ or 4M $Ca(NO_3)_2$. The introduction of base such as CaO* and/or $Ca(OH)_2$ to the calcium salt solution prior to and/or during contact with the organic phase results in the neutralisation of hydrogen ions as they are released from the organic phase, as well as replenishing the calcium ions lost from the aqueous phase.

*(calcium oxide is typically converted into calcium hydroxide upon contact with water)

Bases other than calcium hydroxide and calcium oxide can be added to the calcium salt solution. For instance, the addition of caustic bases, such as NaOH and/or KOH, prior to contact with the organic phase results, in the precipitation of calcium hydroxide. Calcium loading will occur as already mentioned. However, the calcium ions lost from the aqueous phase to the organic phase are not being replenished. Thus the calcium ion concentration of the aqueous phase will have decreased.

Bases such as magnesium oxide and magnesium hydroxide may also be added. However, as well as loading the extractant with calcium ions (by neutralising acidity), some magnesium ions may also load.

It should also be noted that the addition of lime (CaO) and slaked lime ($Ca(OH)_2$) result in the formation of one equivalent or two equivalents of water, respectively. If this water is not removed (for example by evaporation) it will build up and result in the dilution of the calcium salt solution, which for economic reasons is desirably recycled for further calcium loading steps, Method B This method is essentially the same as Method A except that a soluble buffer is added which has a pK in the pH range at which calcium loads into the organic phase. Buffers suitable for aiding calcium loading into hydroxy oxime extractants include glycine, proline, lysine and ethylene diamine. These buffers along with other buffers are outlined in Table 1 Note that these buffers have basic pK's in the pH range in which calcium loads into chelating hydroxy oxime extractants. Buffers with more acidic pK's are of little utility for this purpose.

TABLE 1

Buffers suitable for aiding the loading of calcium and magnesium into organic cation exchange extractants

| Buffer → | Acetic acid | Ethylene diamine | Triethanol-amine | Diethanol-amine | Ammonia | Glycine | Ethylene diamine | Proline | Lysine |
|---|---|---|---|---|---|---|---|---|---|
| Chemical group | Carboxylic acid | Diamine | Trialkanol-amine | Dialkanol-amine | Amine | Amino acid | Diamine | Amine acid | Amino Acid |
| Formula of acid form | $CH_2CO_2H$ | $CaN_2H_{10}^{2-}$ | $C_8NO_{3-}H_{10}^+$ | $C_4NO_{2-}H_{11}^+$ | $NH_4^-$ | $C_2NO_2H_5^+$ | $C_2N_2H_9^+$ | $C_6NO_2H_8^-$ | $C_6N_2O_2^-H_{14}^+$ |
| Amenable to vapour phase separation | Yes | Yes | Yes | Yes | Yes | No | Yes | No | No |
| Vapour phase form | Acid | Di-basic | Base | Base | Base | N.A. | Di-basic | N.A. | N.A. |
| pK of Interest | 4.74 | 7.08 | 7.76 | 8.88 | 9.26 | 9.78 | 10.04 | 10.64 | 10.80 |
| Useful for leaching CaO & $Ca(OH)_2$ | Yes | Yes | Yes | Yes | Yes | Yes | Yes | Yes | Yes |
| Useful for leaching MgO & $Mg(OH)_2$ | Yes | Yes | Yes | Yes | Yes | No | No | No | No |
| Useful for leaching carbonate | Yes | No | No | No | No | No | No | No | No |

The addition of base to the buffered aqueous calcium salt solution results in the consumption of the base and conversion of the buffer's functional group of interest from its acid form to its basic form.

Therefore, when the buffer solution (with some portion of the buffer in its basic form) is contacted with the organic phase, hydrogen ions that are expelled from the organic phase (as a consequence of calcium loading) are neutralised by the buffer.

The use of a buffered system for calcium loading can be beneficial in two main ways. Firstly, if contact of solids with the organic phase is to be avoided, the buffer in its acidic form can be used to pre-dissolve or teach the solid base prior to mixing with the organic extractant. Some organic systems are easily fouled as a result of being contacted with aqueous solutions containing solids.

Secondly, inclusion of a buffer typically increases the rate of dissolution of the solid base during mixing of the aqueous slurry and organic extractant phase.

Here, the buffer in its acidic form attacks the solid base, and in turn is regenerated by hydrogen ions released from the organic phase, thus reforming the acidic form of the buffer and so on. The overall effect being an accelerated rate of dissolution of the solid base.

For most metallurgical operations the buffer containing solution will be recycled for consecutive calcium loading cycles. However, with time some soluble impurities may build up in this recycled solution and may require removal. Soluble impurities may be introduced for instance with the base ($CaO/Ca(OH)_2$ etc).

Regulation of impurities is typically achieved by taking a bleed from the main solution and treating it to remove the impurities, followed by returning the treated bleed back to the main solution. However, some impurities are difficult to remove and it may be necessary to discard the bleed stream.

In these instances, for economic reasons it is advantageous if the buffer can be recovered from the bleed and recycled back into main solution. Vapour phase separation can be a convenient method of achieving this, for instance via known distillation or stripping techniques (steam, nitrogen etc) conducted at suitable pressures and temperatures. Whether or not a buffer is readily amenable to vapour phase separation is outlined in Table 1.

Use of Calcium Loaded Chelating Extractants to Extract Metal Ions from Aqueous Solutions With respect to calcium loaded chelating extractants, the process of cation exchange can be achieved by contacting a cation containing aqueous phase with the calcium loaded organic phase, such that the aqueous cations are extracted into the organic phase in exchange for calcium ions into the aqueous phase. The following ions can be extracted using calcium loaded hydroxy oxime chelating extractants: $H^+$, $Cu^{+2}$, $Zn^{+2}$, $Ni^{+2}$, $Co^{+2}$, $Mn^{+2}$, $Pb^{+2}$ and $Cd^{+2}$.

However, the invention is not limited exclusively to these ions and is intended to include metal ions that may be part of a metal-ligand complex. The metal containing complex may be cationic, neutral, or anionic in nature prior to the extraction of the metal ion from the aqueous solution.

Due to the low affinity of hydroxy oximes for calcium ions, calcium loaded hydroxy oximes will extract hydrogen ions from aqueous solutions to the extent that the resultant aqueous solution can become basic, typically up to pH>10. Therefore, calcium loaded hydroxy oximes tend to raise the pH of solutions they treat.

The extraction of metals, such as copper and nickel, from concentrated chloride solutions is also possible. For example, the extraction of copper from 5M $CaCl_2$ solution ($\equiv$10M $Cl^-$ and where $[Cu^{+2}]<<[Cl^-]$) proceeds essentially to completion when extracting with calcium loaded hydroxy oximes. In comparison, when using the H-form of hydroxy oximes, copper is only very slightly extracted. Note that copper exists primarily as $CuCl_4^{-2}{}_{(aq)}$ at this chloride concentration.

$$CaR_{2(org)} + CuCl_4^{-2}{}_{(aq)} \leftrightarrows CuR_{2(org)} + Ca^{+2}{}_{(aq)} + 4Cl^-{}_{(aq)}$$

(where R represents the organic extractant)

Potential advantages of using calcium loaded hydroxy oximes include:
1. Ability to operate metals recovery circuits with Tower concentrations of the target metal ion/s in the raffinate, i.e., higher % extraction of the target metals.
2. Can utilise a higher % of the exchange capacity of the extractant.
3. Can operate at higher aqueous to organic ratios during metal ion/s extraction.
4. Don't need to add pH elevating agents to the aqueous feed prior and/or during metal ion extraction, to avoid the undesired precipitation of aqueous metal ions in the feed stream.
5. Can respond rapidly to changes like increases or decreases in the acidity and or metal ion content of the aqueous feed, by adjusting the extent of calcium loading.

Organic Acid Extractants

The organic acid extractants of this invention are preferably but not limited to the following:

Group 7. Carboxylic acids
   a. (Z)-9-octadecenoic acid
   b. Isostearic acid
   c. 2-Octyl-dodecanoic acid
   d. 2-Hexyl-decanoic acid
   e. 2-Butyl-octanoic acid
   f. Naphthenic acid
   g. Versatic acid Group 2. Organo-phosphorus acids
   h. Di-2-ethylhexylphosphoric acid (D2EHPA)
   i. 2-Ethylhexyl phosphonic acid mono-2-ethylhexyl ester (IONQUEST 801)
   j. Bis(2,4,4-trimethylpentyl)phosphinic acid (CYANEX 272)

Typically, an extractant, or any mixture of extractants, is dissolved in a suitable hydrocarbon prior to use. Also, a phase modifier such as a para-alkylphenol, an alkylphosphine oxide, and/or a long chain alcohol may be added. However, these are usually not required. With respect to the loading of calcium into the organic extractant, the addition of a phase modifier is optional, but may act to increase the solubility of the organic acid and/or its calcium salt in the organic phase. This is particularly the case for systems using the calcium salt of (Z)-9-octadecenoic acid, which typically requires modifier addition to increase its solubility in the organic phase. The following organic mixtures are given as examples:

Group 7. Carboxylic acids
1. (Z)-9-Octadecenoic acid/Exxsol D80 (diluent)/dodecanol (phase modifier).
2. (Z)-9-Octadecenoic acid/Exxsol D80 (diluent)/iso-tridecanol (phase modifier).
3. (Z)-9-Octadecenoic acid/Recosol 150 (diluent)/tetradecanol (phase modifier).
4. (Z)-9-Octadecenoic acid/Shellsol 2046 (diluent)/dodecanol (phase modifier).
5. (Z)-9-Octadecenoic acid/naphthenic acid/Exxsol D80 (diluent).
6. (Z)-9-Octadecenoic acid/IONQUEST 801/Exxsol D80(diluent).
7. (Z)-9-Octadecenoic acid/Exxsol D80 (diluent)/CYANEX 923 (alkylphosphine oxide phase modifier)
8. Isostearic acid/Shellsol 2046 (diluent)
9. Isostearic acid/Recosol 150 (diluent)
10. Isostearic acid/Exxsol D80 (diluent)

11. 2-Octyl-dodecanoic acid/Exxsol D80 (diluent)
12. 2-Hexyl-decanoic acid/Exxsol D80 (diluent)
13. 2-Butyl-octanoic acid/Exxsol D80 (diluent)
14. Naphthenic acid/Exxsol D80 (diluent)

Group 2. Organophosphorus acids

15. D2EHPA/Exxsol D80 (diluent)
16. IONQUEST 801/Exxsol D80 (diluent)
17. CYANEX 272/Exxsol D80 (diluent)
18. CYANEX 272/Exxsol D80 (diluent)/para-nonylphenol (phase modifier)

Preparation of Calcium Loaded Organic Acid Extractants

As with chelating extractants, organic acid extractants are usually available in the hydrogen form. Calcium loading involves the displacement of hydrogen ions from the organic phase, in exchange for calcium ions from the aqueous phase. The extent of calcium loading is adjustable, and can be matched to the particular requirements of the intended application.

Typically, the loading of calcium into organic acid extractants occurs at a pH lower than the pH for hydroxy oximes. If significant calcium loading is to occur, hydrogen ions released from the organic phase must be neutralised. Controlling the hydrogen ion activity in the aqueous phase is therefore necessary. Two broad methods are utilised for achieving significant calcium loading into organic acid extractants, these methods are (as per chelating extractants):

A' Contacting the organic phase with an aqueous solution of a calcium salt to which base is added.

B' Contacting the organic phase with an aqueous solution containing a dissolved calcium salt and a buffer, to which base is added.

Methods A' and B' are the same as Methods A and B for calcium loading chelating extractants, with two exceptions.

The first exception applies to Method B' which uses a buffer.

Since the loading of calcium typically occurs at a lower pH than for hydroxy oxime extractants, the use of a buffer with a more acidic pK is possible. For example, an acetate buffer can be used (pK=4.74), an ethylene diamine buffer (pK of interest=7.08), a triethanolamine buffer (pK=7.76), or an ammonium buffer (pK=9.26). The addition of base to the buffered aqueous calcium salt solution results in the consumption of the base and conversion of the buffer's functional group of interest from its acid form to its basic form.

Therefore, when the buffer solution (with some portion of the buffer in its basic form) is contacted with the organic phase, hydrogen ions that are expelled from the organic phase (as a consequence of calcium loading) are neutralised by the buffer.

The use of a buffered system for calcium loading can be beneficial in three main ways, two of which are the same described in Method B for chelating extractants.

Additionally, the buffer can be selected such that calcium and magnesium oxides and hydroxides can be selectively leached over calcium and magnesium carbonates. For instance, buffers such as ethylene diamine (pK of interest= 7.08), triethanolamine (pK=7.76), diethanolamine (pK= 8.88) and ammonium (pK=9.26) will selectively leach magnesium oxides and hydroxides in the presence of calcium carbonate.

For the most part this is due to the chemical stability of calcium and magnesium carbonates as well as the above buffers being less acidic than carbonic acid ($H_2CO_3$), which has a pK of 6.36. Consequently, these buffers regulate the pH of the solution such that the conditions are not acidic enough to decompose carbonic acid into carbon dioxide and water, which is a necessary step for the significant dissolution of calcium carbonate etc.

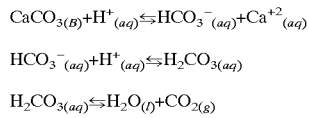

$$CaCO_{3(B)} + H^+_{(aq)} \rightleftharpoons HCO_3^-_{(aq)} + Ca^{+2}_{(aq)}$$

$$HCO_3^-_{(aq)} + H^+_{(aq)} \rightleftharpoons H_2CO_{3(aq)}$$

$$H_2CO_{3(aq)} \rightleftharpoons H_2O_{(l)} + CO_{2(g)}$$

The second exception applies to Methods A' and B'.

Since the loading of calcium typically occurs at a lower pH than that for hydroxy oxime extractants, the use of calcium salts, such as calcium carbonate (limestone) as the added base, is possible. Typically, concentrated calcium salt solutions are used to help maintain a hydrogen ion activity as high as possible throughout calcium loading (as per Method A for chelating extractants). Therefore, the rate of consumption of calcium carbonate is increased and rapid calcium loading of the organic phase is achieved. This is accompanied by the evolution of carbon dioxide gas.

With respect to method B', calcium loading via calcium carbonate can be aided by the use of acetic acid as the buffer. Acetic acid has a pK that is more acidic than carbonic acid, and accordingly is able to decompose calcium carbonate into water and carbon dioxide.

Preparation of Substantially Pure Magnesium Loaded Organic Extractant

Purified magnesium chloride solutions can be made by either of methods A' or B', which allow the use of basic magnesium feedstocks such as magnesite ($MgCO_3$), dolomite ($MgCO_3 \cdot CaCO_3$), basic magnesium carbonates ($xMgCO_3 \cdot yMg(OH)_2 \cdot zH_2O$), hydrated magnesium carbonates ($MgCO_3 \cdot xH_2O$), magnesium oxide (MgO) or magnesium hydroxide ($Mg(OH)_2$) as the source of magnesium.

In addition, the combination of magnesium sulphate with a basic calcium salt such as lime (CaO) or limestone ($CaCO_3$) can serve as the source of magnesium.

Where magnesite or dolomite are to be used, it is desirable that these materials are first calcined to convert the magnesium carbonate component into magnesium oxide. The calcination of magnesium carbonate is practiced world wide and is typically conducted at temperatures approximately between 500° C. and 900° C. i.e.,

$$MgCO_{3(B)} \rightarrow 500 \text{ to } 900° C. \rightarrow MgO_{(B)} + CO_{2(g)}$$

More preferably for these materials, the calcination temperature should be controlled such that it is below the calcination temperature of $CaCO_3$, which begins to calcine at temperatures above approximately 825° C. The selective calcination of magnesium carbonate to magnesium oxide in the presence of calcium carbonate is a well established practice for producing mixtures of MgO and $CaCO_3$.

Reasonably pure magnesium chloride is used for the production of magnesium metal by electrolysis of the molten salt at temperatures typically between 680° C. and 750° C. It is important that the magnesium chloride feed to the electrolytic cell is substantially free from impurities such as calcium and iron etc.

Magnesium containing deposits such as magnesite ($MgCO_3$) are typically mined to provide the source of magnesium. It is typical to digest the source material with strong hydrochloric acid solution to form a concentrated solution of magnesium chloride referred to as brine. Usually the brine is then processed to remove some or all of the water, yielding hydrated ($MgCl_2 \cdot 2H_2O$) or anhydrous ($MgCl_2$) magnesium chloride respectively.

However, the magnesium feedstock typically contains impurities such as $CaCO_{3(G)}$, $CaO_{(B)}$, $NaCl_{(B)}$, Borates and less soluble impurities such as talc and iron oxides etc. These materials are also usually dissolved by strong HCl solution, and thus become part of the magnesium chloride brine.

Therefore, these impurities must be removed from the brine to make it suitable as a source of magnesium chloride for magnesium metal production via molten electrolysis.

By using methods A' and B' (preferably B') the impurities are avoided when the magnesium loaded organic extractant is formed. Avoiding calcium loading into the organic phase is achieved by one or more of the following:

1. Selective calcination of feedstocks containing mixtures of magnesium carbonate and calcium carbonate (magnesite and dolomite etc). Followed by the use of a buffer which selectively leaches MgO over $CaCO_3$ (e.g. ethylene diamine pK of interest=7.08, triethanolamine pK=7.76, diethanolamine pK=8.88 or ammonium pK=9.26).
2. Selecting an extractant that prefers magnesium ions over calcium ions, for example CYANEX 272.
3. Maintaining a high ratio of $Mg^{+2}$ activity to $Ca^{+2}$ in the aqueous phase which is achieved by:
    Using a concentrated magnesium chloride solution as the aqueous phase
    Removing introduced calcium ions from the aqueous solution after each magnesium loading cycle.

The removal of calcium ions can be conveniently achieved by having an excess of sulphate ions in the aqueous solution which causes most of the calcium to precipitate as calcium sulphate. This is then conveniently separated from the aqueous solution by settling, filtration etc, prior to another magnesium loading cycle. Doing this guarantees that the calcium concentration in the aqueous solution is regulated at a minimum level throughout successive magnesium loading cycles.

An additional advantage of the process is that the less soluble impurities such as talc, iron oxides etc are not appreciably dissolved during the magnesium loading step, as the conditions are much less aggressive than when using strong HCl. Therefore these impurities don't end up in the magnesium chloride brine, and can exit the circuit with the calcium sulphate precipitate.

Use of Calcium Loaded Organic Acid Extractants to Extract Metal Ions from Aqueous Solutions With respect to calcium loaded organic acid extractants, the process of cation exchange can be achieved by contacting a cation containing aqueous phase with the calcium loaded organic phase, such that the aqueous cations are extracted into the organic phase in exchange for the calcium ions into the aqueous phase. The following ions can be extracted using calcium loaded organic acid extractants: $H^+$, $Fe^{+3}$, $Al^{+3}$, $Fe^{+2}$, $Hg^{+2}$, $Cu^{+2}$, $Zn^{+2}$, $Ni^{+2}$, $Co^{+2}$, $Mn^{+2}$, $Pb^{+2}$ and $Cd^{+2}$.

However, the invention is not limited exclusively to these ions, and is intended to include metals ions that may be part of a metal-ligand complex. The metal containing complex may be cationic, neutral, or anionic in nature prior to the extraction of the metal ion from the aqueous solution.

The use of carboxylic acid extractants at pH>5 can result in considerable loss of the carboxylate anion to the aqueous solution. This typically occurs when bases such as ammonia and/or sodium hydroxide are used to maintain the preferred extraction pH. Ammonium and sodium carboxylate salts are usually quite water soluble and therefore tend to pollute the aqueous feed streams they contact.

The calcium salts of some carboxylates are substantially water insoluble. Therefore, using a calcium carboxylate as an extractant (even at pH>7) minimises the loss of carboxylate anion to the aqueous phase. The following carboxylic acids form substantially insoluble calcium salts: (Z)-9-octadecenoic acid, isostearic acid, 2-octyl-dodecanoic acid and 2-hexyl-decanoic acid. Systems using these calcium carboxylates (or any other organic acid extractant having a substantially insoluble calcium salt) have minimal losses of the extractant to the aqueous phase.

Calcium loaded organic acid extractants will extract hydrogen ions from aqueous solutions to the extent that the resultant aqueous solution can become less acidic or even weakly basic. Therefore, calcium loaded organic acid extractants tend to raise the pH of solutions they treat (just like calcium loaded chelating extractants).

Mixtures of Calcium Loaded Organic Acid Extractants and Chelating Hydroxy Oximes The mixtures of organic acid extractants and chelating hydroxy oximes of this invention are preferably but not limited to the following:

Group 1. Mixtures of carboxylic acids and chelating hydroxy oximes
  a. Naphthenic acid/2-Hydroxy-6-nonylacetophenone oxime (LIX 84-I)
  b. Naphthenic acid/5-Nonylsalicylaldoxime (LIX 860N-I)
  c. Naphthenic acid/equivolume mixture of 2-Hydroxy-5-nonylacetophenone oxime & 6-Nonylsalicylaldoxime (LIX 984N)
  d. 2Hexyl-decanoic acid/2-Hydroxy-5-nonylacetophenone oxime (LIX 84-I)
  e. 2-Hexyl-decanoic acid/5-Nonylsalicylaldoxime (LIX 860N-I)
  f. 2-Hexyl-decanoic acid/equivolume mixture of 2-Hydroxy-5-nonylacetophenone oxime & 5-Nonylsalicylaldoxime (LIX 984N)

Group 2. Mixtures of organo-phosphorus acids and chelating hydroxy oximes
  a. CYANEX 272/2-Hydroxy-5-nonylacetophenone oxime (LIX 84-I)

Choice of hydrocarbon diluents and phase modifiers is the same as for that used for organic acid extractants. For example, any of the above systems are conveniently diluted into Shellsol 2046) without modification.

Preparation of Mixtures of Calcium Loaded Organic Acid Extractants and Chelating Hydroxy Oxime Extractants Calcium loading of these mixtures is for the most part identical to that outlined for organic acid extractants. In particular, the mixture behaves as if the chelating hydroxy oxime were not present at all. This is evidenced by the calcium loading pH range being essentially unchanged by the introduction of chelating hydroxy oxime extractant.

An advantage is that magnesium can be loaded into the organic mixture according to the methods outlined for organic acid extractants. Therefore this allows magnesium to be used as the exchangeable cation for the extraction of other metals, thus overcoming the difficulties associated with the process of magnesium loading the chelating hydroxy oxime extractants.

Additionally, the scope of which calcium and magnesium can be loaded into the organic mixture is expanded into that provided for by the organic acid extractants, thereby giving more flexibility with respect to the choice of buffer if required.

Use of Mixtures of Calcium Loaded Organic Acid Extractants and Chelating Hydroxy Oximes to Extract Metal Ions from Aqueous Solutions The use of calcium loaded mixtures of organic acid extractants and chelating hydroxy oximes has the same applications as that for calcium loaded chelating hydroxy oximes. For example, the extraction of copper and nickel from concentrated chloride solutions is likewise possible.

For example, a calcium loaded mixture of naphthenic acid and LIX 84-I will extract nickel ions from a 5M $CaCl_2$ solution. During this extraction the aqueous phase becomes acidic due to the strong affinity of the oxime for nickel ions. This acidity is then extracted back into the organic phase by the release of calcium ions from the organic phase. The overall outcome being the extraction of nickel in exchange for calcium ions.

Acid Stripping

Acid stripping involves contacting the loaded organic extractant with an aqueous acid solution. The metal ions associated with the extractant are stripped from the organic phase to the aqueous phase leaving the extractant in its hydrogen form in the organic phase. The extractant can then be recycled if desired.

Typical acids include strong inorganic acids such as sulphuric acid, nitric acid and hydrochloric acid.

EXAMPLES

The invention is further described, by way of example only, in FIGS. 1 to 4 of the accompanying drawings, and in Examples 1 to 11.

FIG. 1 shows a continuous circuit for the production of purified magnesium chloride solution and/or magnesium chloride hexahydrate solid from basic magnesium carbonate feedstock that contains calcium impurities.

A slurry of basic magnesium carbonate (1) is mixed with an organic extractant (2) in an organic solvent at a mixing stage (3). The slurry (1) contains magnesium ions, chloride ions, an acetate buffer, calcium ions, and sulphate ions, as well as calcium carbonate and calcium oxide impurities. Basic magnesium carbonate (4) is introduced and sufficient $H_2SO_4$ (5) added so that the slurry (1) is saturated with respect to calcium sulphate.

Following mixing at stage (3) to load the organic extractant (2) with magnesium, the aqueous and organic phases are allowed to separate out at stage (6) to give the magnesium loaded organic extractant (7) in the upper layer and the raffinate (8) in the lower layer. The raffinate (8) is drawn off and its pH is increased by the addition of a magnesium base (9), such as hydrated magnesium carbonate or magnesium oxide, at stage (10). The raffinate (8) is then thickened at stage (11) before filtering the underflow at stage (12). The resultant solids (13), including calcium sulphate and other insoluble impurities, are washed with water (14) to give washed solids (15) and spent wash water (16). The water (16) is combined with water streams recovered from stages (11) and (12) to give the aqueous stream (17). The stream (17) is bled at stage (18) to remove excess water via evaporation. Any steam produced (19) can be condensed and recycled if desired.

A second bleed occurs at stage (20) to control any build up of soluble impurities. The bleed stream (20) is acidified by introducing acid (21) so that any acetate is converted to acetic acid which can be recovered via vapour phase separation. This recycled acetic acid (22) can be used again as a buffer for the slurry (1).

The magnesium loaded organic extractant (7) is transferred from stage (6) to mixing stage (23). Concentrated HCl solution (24), or a mixture of concentrated HCl and magnesium chloride (25), is introduced into mixing stage (23). Following mixing, the organic and aqueous phases are then allowed to separate out at stage (26) to give the organic extractant (2) in the upper layer and clean magnesium chloride solution (27), which may or may not contain some solid magnesium chloride hexahydrate. This solution (27) can then be further processed to recover magnesium metal of high purity, for example by electrolysis. The aqueous waste solution (28) can also be further processed to recover magnesium and chloride values.

Figure 2:
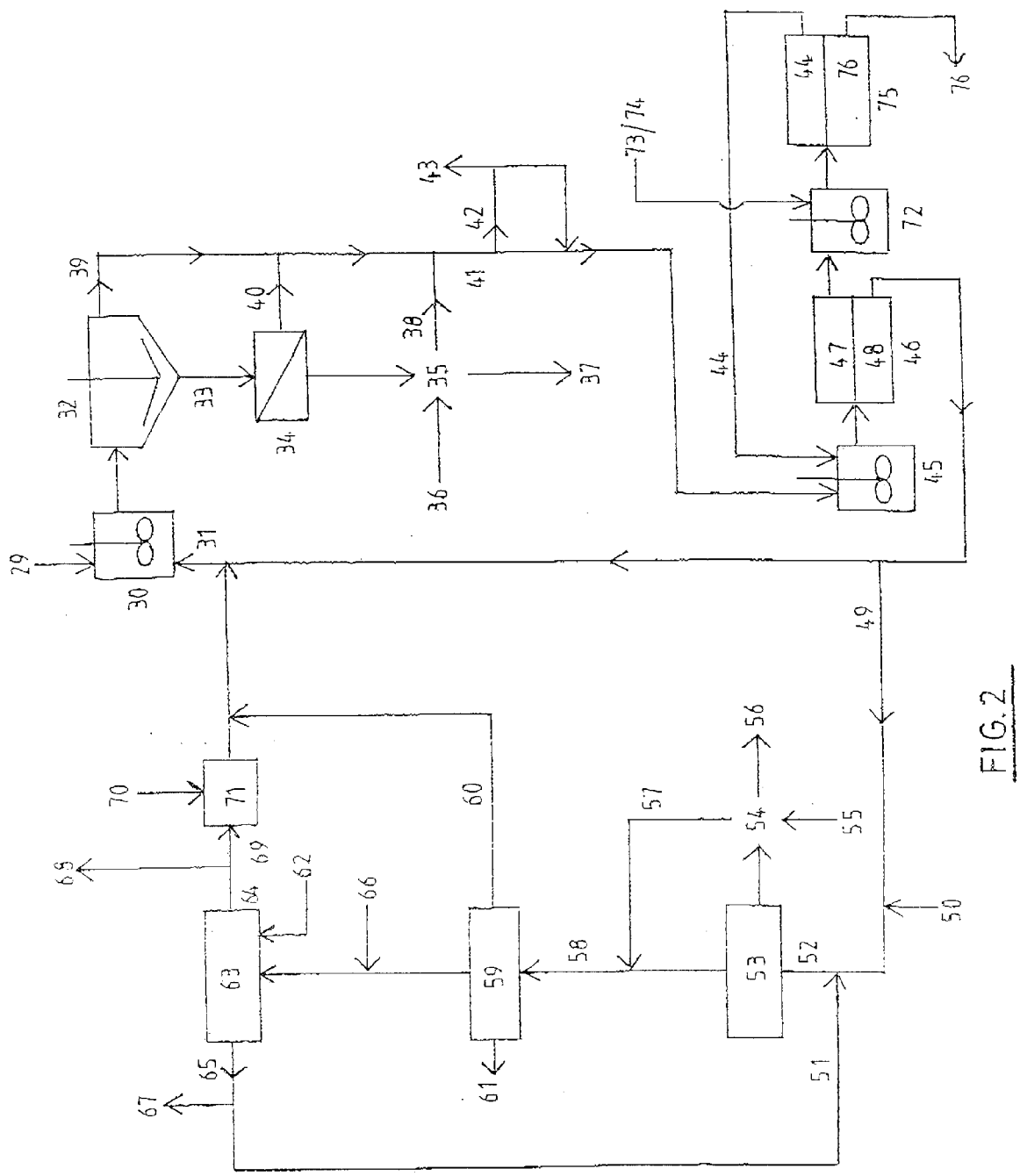
FIG. 2 shows a continuous circuit for the production of purified magnesium chloride solution and/or magnesium chloride hexahydrate solid from selectively calcined magnesite and/or dolomite.

FIG. 2 shows a continuous circuit for the production of purified magnesium chloride solution and/or magnesium chloride hexahydrate solid from selectively calcined magnesite and/or dolomite.

Selectively calcined magnesite and/or dolomite feed (29) is introduced to mixing stage (30), where magnesium oxide is selectively leached using aqueous solution (31) which contains a triethanolamine hydrochloride buffer, magnesium ions, chloride ions and sulphate ions if required.

Following mixing at stage (30) to leach magnesium oxide, the solution is thickened at stage (32) before filtering the underflow (33) at stage (34). The resultant solids (35), including unreacted calcium carbonate and other insoluble impurities, are washed with water (36) to give washed solids (37) and spent wash water (38). The water (38) is combined with water streams (39) and (40) recovered from stages (32) and (34) to give the aqueous stream (41). The stream (41) is bled at stage (42) to remove excess water via evaporation. Any steam produced (43) can be condensed and recycled if desired.

The aqueous stream (41) is mixed with an organic extractant (44) in an organic solvent at a mixing stage (45). Following mixing at stage (45) to load the organic extractant (44) with magnesium, the aqueous and organic phases are allowed to separate out at stage (46) to give the magnesium loaded organic extractant (47) in the upper layer and the raffinate (48) in the lower layer.

A second bleed occurs at stage (49) to control any build up of soluble impurities. The bleed stream is basified by introducing calcium oxide and/or calcium hydroxide (50) to convert all triethanolamine hydrochloride into triethanolamine, and to precipitate magnesium ions as solid magnesium hydroxide. The introduction of sodium sulphate (51) causes the precipitation of calcium sulphate, resulting in a solution (52) containing sodium chloride as the major dissolved salt. The solution (52), containing calcium sulphate solids and magnesium hydroxide solids, goes to a solids separation stage (53).

Following separation of the solids at stage (53), the resultant solids (54) are washed with water (55) to give washed solids (56) and spent wash water (57). The water (57) is combined with the recovered water from stage (53) to give aqueous stream (58), comprising mostly sodium chloride and triethanolamine.

The stream (58) goes to a separation stage (59) where water and triethanolamine (60) are removed via vapour phase separation, leaving behind sodium chloride. Any steam produced (61) can be condensed and recycled if desired. Sodium chloride from stage (69) can be washed with ethanol (not shown) to recover entrained triethanolamine.

Sulphuric acid (62) and ethanol washed sodium chloride from stage (59) are reacted together with heating in the reactor (63) to produce hydrogen chloride gas (64) and sodium sulphate (65). Additional sodium chloride (66) can be introduced. A bleed of sodium sulphate (67) is taken to control the build up of impurities.

Some of the hydrogen chloride gas (64) produced can be drawn off to stream (68) where hydrogen chloride gas can be dissolved in water to form hydrochloric acid solution. The remainder (69) is dissolved in water (70) at stage (71) to form hydrochloric acid solution which is combined with triethanolamine (60) and recycled back into aqueous solution (31).

The magnesium loaded organic extractant (47) is transferred from stage (46) to mixing stage (72) for acid stripping. The magnesium loaded organic extractant can be scrubbed (not shown) with magnesium chloride solution prior to acid stripping in mixing stage (72). Spent scrub solution (not shown) can be used as water (70).

Concentrated hydrochloric acid solution (73), or a mixture of concentrated hydrochloric acid and magnesium chloride (74), is introduced into mixing stage (72). Following mixing, the organic and aqueous phases are allowed to separate out at stage (75) to give the organic extractant (44) in the upper layer and clean magnesium chloride solution (76) in the lower layer, which may or may not contain some solid magnesium chloride hexahydrate. This solution (76) can then be further processed to recover magnesium metal of high purity, for example by electrolysis.

Figure 3:
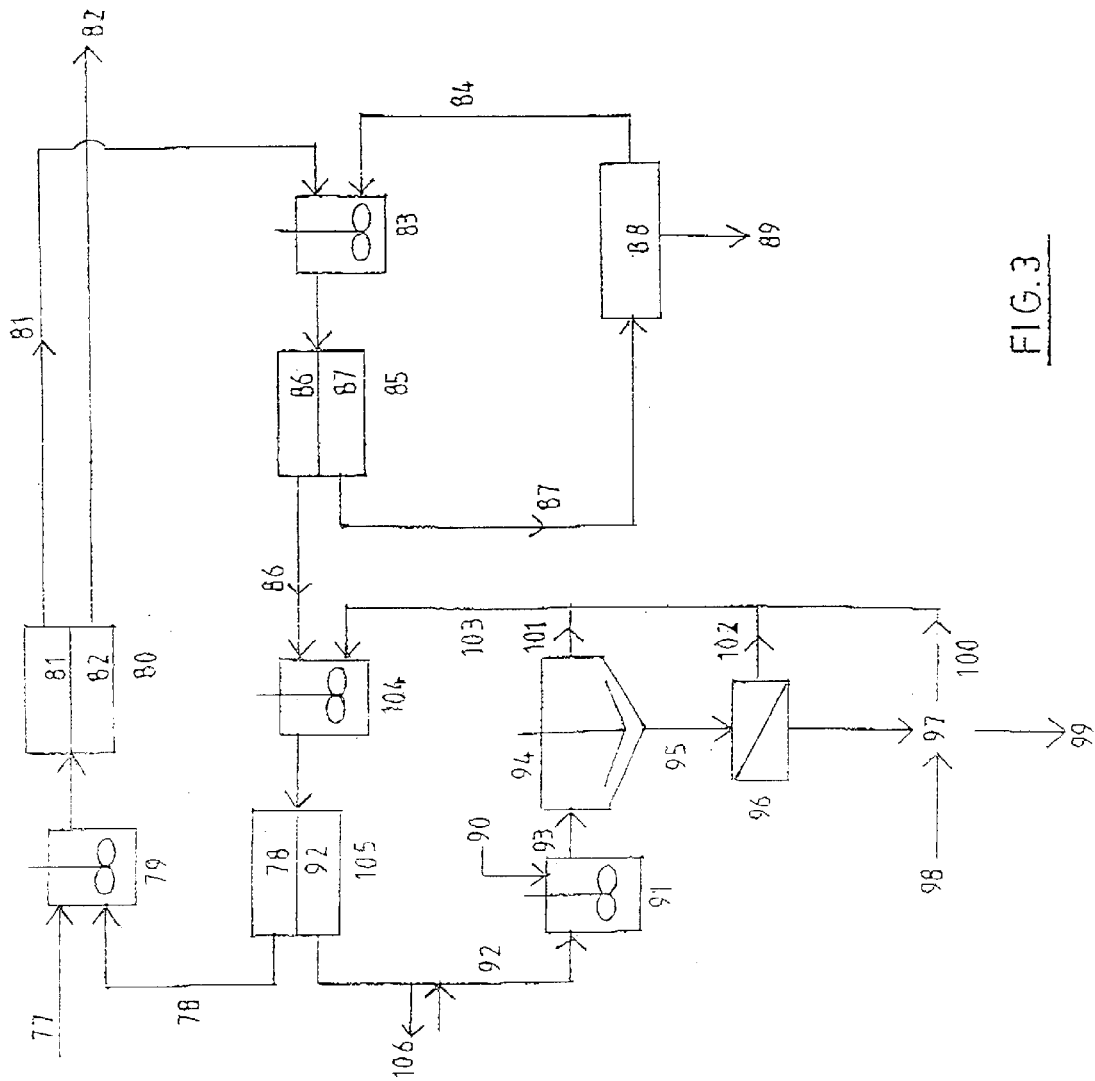
FIG. 3 shows a continuous circuit for the extraction of nickel ions from aqueous solution using a calcium loaded organic mixture of a chelating hydroxy oxime and an organic acid extractant.

FIG. 3 shows a continuous circuit for the extraction of nickel ions from aqueous solution using a calcium loaded organic mixture of a chelating hydroxy oxime and an organic acid extractant. Nickel metal is produced electrolytically from a sulphate bath.

An aqueous feed containing nickel ions (77) is mixed with a calcium loaded organic extractant (78) in an organic solvent at a mixing stage (79). Following mixing at stage (79) to load the organic extractant (78) with nickel, the aqueous and organic phases are allowed to separate out at stage (80) to give the nickel loaded organic extractant (81) in the upper layer and the raffinate (82) in the lower layer.

The nickel loaded organic extractant (81) is transferred from stage (80) to mixing stage (83) for acid stripping. Prior to this the nickel loaded organic extractant (81) can be scrubbed (not shown) with nickel sulphate solution prior to acid stripping in mixing stage (83). Spent scrub solution can be recycled to feed stream (77).

Sulphuric acid/nickel sulphate strip solution (84) is introduced into mixing stage (83). Following mixing, the organic and aqueous phases are allowed to separate out at stage (85) to give the barren organic extractant (86) in the upper layer and a nickel sulphate rich solution (87). This solution (87) is transferred to a nickel electrowinning stage (88) where nickel metal (89) is produced as well as sulphuric acid/nickel sulphate strip solution (84).

Calcium oxide and/or calcium hydroxide (90) is introduced to mixing stage (91), where calcium oxide and/or calcium hydroxide is leached using an aqueous solution (92) which contains an ammonium chloride buffer, calcium ions and chloride ions.

Following mixing at stage (91) to leach calcium oxide and/or calcium hydroxide, the leach solution (93) is thickened at stage (94) before filtering the underflow (95) at stage (96). The resultant solids (97), including insoluble impurities, are washed with water (98) to give washed solids (99) and spent wash water (100).

The water (100) is combined with water streams (101) and (102) recovered from stages (94) and (96) to give aqueous stream (103). The aqueous stream (103) is mixed with barren organic extractant (86) at mixing stage (104) to calcium load the organic extractant. Following mixing at stage (104) lo load the organic extractant (86) with calcium, the aqueous and organic phases are allowed to separate out at stage (105) to give the calcium loaded organic extractant (78) in the upper layer and aqueous solution (92) in the lower layer.

The stream (92) may be bled to remove excess water via evaporation and any steam produced can be condensed and recycled if desired. In addition, the bleed (106) also controls the build up of soluble impurities. Buffer can be recovered as ammonia using a lime boil.

Figure 4:
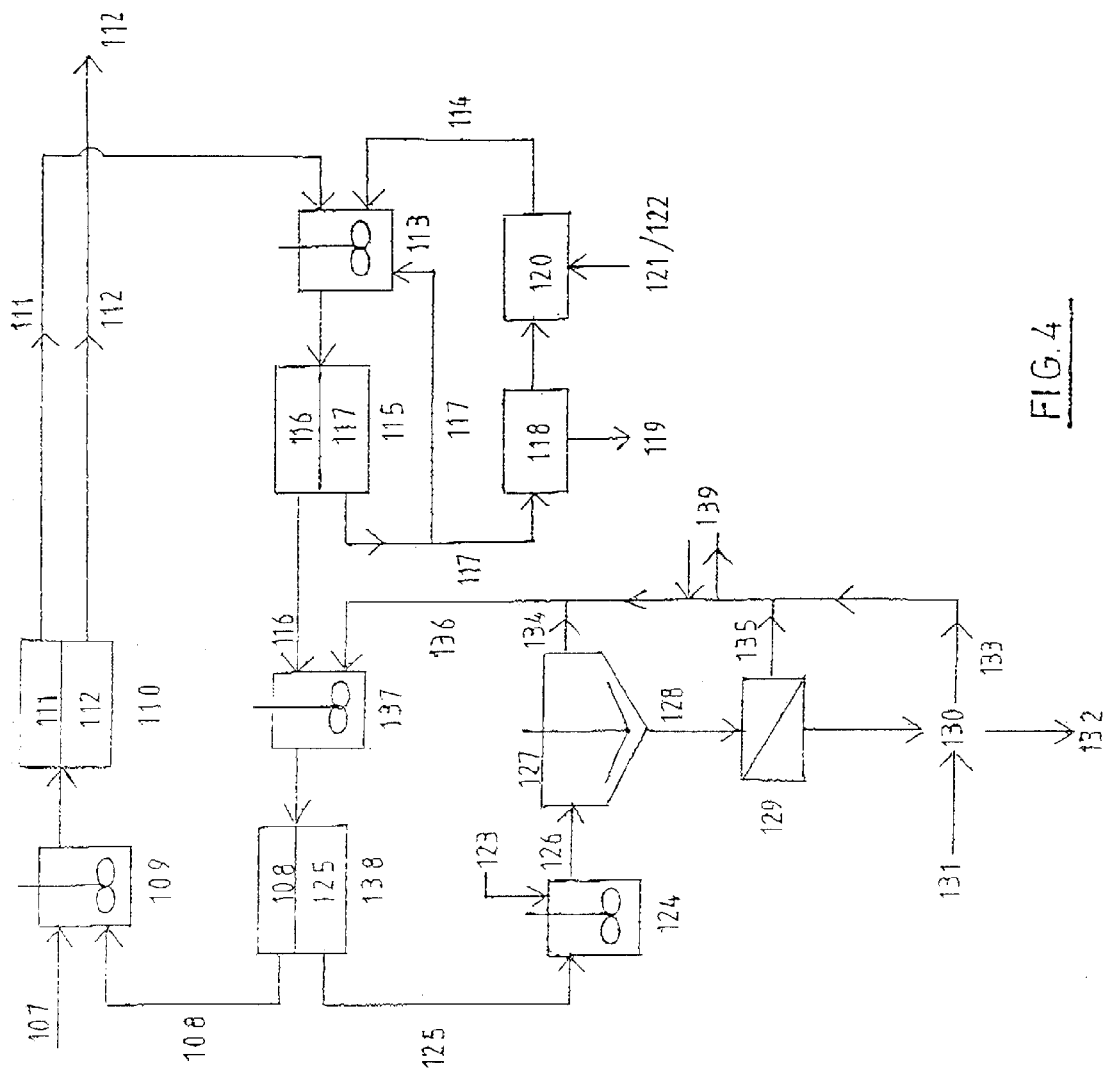
FIG. 4 shows a continuous circuit for the extraction of ferric ions from aqueous solution using calcium loaded IONQUEST 801.

FIG. 4 shows a continuous circuit for the extraction of ferric ions from aqueous solution using calcium loaded IONQUEST 801. Iron is recovered as iron oxide by spray pyrolysis.

Aqueous feed (107) containing ferric ions is mixed with calcium loaded organic extractant (108) in an organic solvent at a mixing stage (109). Following mixing at stage (109) to load the organic extractant (108) with iron, the aqueous and organic phases are allowed to separate out at stage (110) to give the iron loaded organic extractant (111) in the upper layer and the raffinate (112) in the tower layer.

The iron loaded organic extractant (111) is transferred from stage (110) to a mixing stage (113) for acid stripping. Prior to this the iron loaded organic extractant (111) can be scrubbed (not shown) with a solution of ferric ions prior to acid stripping in mixing stage (113). Spent scrub solution can be recycled back to feed stream (107).

Hydrochloric acid strip solution (114) is introduced into mixing stage (113). Following mixing, the organic and aqueous phases are allowed to separate out at stage (115) to give the barren organic extractant (116) in the upper layer and a ferric chloride rich solution (117).

Some of this solution (117) is transferred back into mixing stage (113), with the remainder transferred to a spray pyrolysis stage (118). The spray pyrolysis stage (118) produces iron oxide values (119), and hydrogen chloride gas and steam which are condensed at stage (120). Make-up water (121) and hydrochloric acid (122) are added to stage (120) to produce hydrochloric acid strip solution (114).

Calcium carbonate (123) is introduced to mixing stage (124), where calcium carbonate is leached using an aqueous solution (125) containing acetic acid buffer, calcium ions and chloride ions. Following mixing at stage (124) to leach calcium carbonate, the leach solution (126) is thickened at stage (127) before filtering the underflow (128) at stage (129). The resultant solids (130), including insoluble impurities are washed with water (131) to give washed solids (132) and spent wash water (133).

The water (133) is combined with water streams (134) and (135) recovered from stages (127) and (129) to give aqueous stream (136). The aqueous stream (136) is mixed with barren organic extractant (116) at mixing stage (137) to calcium load the organic extractant. Following mixing at stage (137) to load the organic extractant (116) with calcium, the aqueous and organic phases are allowed to separate out at stage (138) to give calcium loaded organic extractant (108) in the upper layer and aqueous solution (125) in the lower layer.

The stream (136) may be bled at (139) to remove excess water and to control soluble impurities in a similar fashion to that shown in FIG. 1.

Example 1

This example illustrates the selective loading of magnesium over calcium into the organic extractant CYANEX 272 using Method B. The example uses a slurry of magnesium chloride, acetate buffer, and basic magnesium carbonate for loading magnesium ions into the organic extractant, followed by acid stripping to produce a magnesium chloride brine essentially free of calcium ions.

An aqueous solution containing ≈30 wt % $MgCl_2$, ≈0.24 M acetate buffer and 0.035 M to 0.05 M sulphate ions was saturated with respect to gypsum ($CaSO_4.2H_2O_{(S)}$) at ≈30° C.

Magnesium feedstock composed of basic magnesium carbonate and calcium carbonate was added to form a slurry containing 120 g of feed solids per liter of 30 wt % $MgCl_2$ solution. The mole ratio of magnesium to calcium in the feed solids was ≈50:1.

Also added was the mole equivalent of concentrated sulphuric acid (98 wt %) sufficient to match the calcium content of the feed solids. This resulted in a small amount of dissolution of the feed material and minor carbon dioxide gas evolution.

A sample of 40 wt % CYANEX 272 in Exxsol D80 (diluent) was contacted with the above slurry at an organic to aqueous ratio of ≈5:1 for 6 min at ≈30° C. During mixing, carbon dioxide gas was liberated.

After mixing, both phases separated within 60 seconds. The aqueous phase contained only a minor amount of residual solids, with nearly all of the feed material having been consumed. The pH of the resulting aqueous solution was 2.52. The magnesium loaded organic phase was transparent and free of third phase formation. Within one hour of standing, gypsum solids precipitated from the aqueous phase as a result of the calcium introduced with the feed material.

A sample of the magnesium loaded organic was removed and acid stripped with sufficient hydrochloric acid solution to ensure complete magnesium and calcium stripping. The resulting aqueous magnesium chloride brine was analysed and found to have a magnesium to calcium mole ratio of ≈2,093:1. The calcium content of the product brine was therefore ≈42 times less than that of the feed solids.

Example 2

This example illustrates the use of Method B to selectively leach (pre-dissolve) $MgO_{(S)}$ in the presence of $CaCO_3$ $(S)$ using a triethanolamine buffer, followed by loading magnesium into the organic extractant CYANEX 272 and hydrochloric acid stripping of the loaded organic phase to produce a magnesium chloride brine essentially free of calcium ions.

An aqueous solution containing ≈1.8 M triethanolamine hydrochloride buffer, 2,310 mg/L of magnesium ions as $MgCl_2$, and 1.1 mg/L of calcium ions has a pH of 5.41 at 40° C.

A mixture containing ≈90 wt % $MgO_{(S)}$ and ≈10 wt % $CaCO_{3(S)}$ having a mole ratio of magnesium to calcium of ≈22.4:1, was added to the above solution to form a slurry containing initially ≈2.54 wt % solids. Since the buffer was in its acidic form, leaching of $MgO_{(S)}$ ensued.

After 60 minutes of agitation, significant leaching of $MgO_{(S)}$ had occurred and the aqueous solution was found to contain 16,500 mg/L of magnesium ions and 88.7 mg/L of calcium ions, with the pH having increased to 7.31. The amount of $MgO_{(S)}$ and $CaCO_{3(S)}$ leached was calculated to be ≈93.4% and ≈7.31%, respectively. Unreacted solids were removed from the leach solution via settling and filtration to yield a solution free of solids.

A sample of 30 wt % CYANEX 272 in Exxsol D80 (diluent) was contacted with the clarified solution at an organic to aqueous ratio of ≈2.19:1 for 90 seconds at ≈40° C.

After mixing, both phases separated within 60 seconds. The aqueous phase was totally clear and found to contain 2,310 mg/L of magnesium ions and 71.4 mg/L of calcium ions. The pH was 5.16. The magnesium loaded organic was transparent and free of third phase formation.

The mole ratio of magnesium to calcium in the organic phase was found to be ≈1,352:1. The calcium content of the organic phase was therefore ≈60 times less than that of the feed material. Concentrated hydrochloric acid stripping formed a concentrated magnesium chloride brine of comparable purity, Example 3

This example illustrates the use of Method B to produce magnesium chloride brine and hexahydrate crystal essentially free of calcium ions, by the combined use of magnesium sulphate and calcium carbonate as the feed materials.

An aqueous solution containing ≈30 wt % $MgCl_2$, ≈0.24 M acetate buffer and 0.036 M to 0.05 M sulphate ions was saturated with respect to gypsum ($CaSO_4.2H_2O_{(S)}$) at ≈40° C.

Calcium carbonate feed material was added to form a slurry containing ≈74 g of feed solids per liter of 30 wt % $MgCl_2$ solution. The slurry was agitated for 10 min in order to wet the feed solids.

A sample of 38 wt % CYANEX 272 in Exxsol D80 (diluent) was contacted with the above slurry at an organic to aqueous ratio of ≈2.5:1 for 6 min at ≈40° C. During mixing, carbon dioxide gas was liberated.

After mixing, both phases separated within 60 seconds. The aqueous phase contained only a minor amount of residual solids, with nearly all of the feed material having been consumed. The pH of the resulting solution was 1.85. After standing for 10 min, minor gypsum solids precipitated from the aqueous phase as a result of the calcium introduced with the feed material. The magnesium loaded organic was transparent and free of third phase formation.

Magnesium sulphate (as the heptahydrate) was added to the above aqueous solution at a rate of ≈177 g of $MgSO_4.7H_2O_{(s)}$ per liter of solution. This acted to replace the magnesium ions that loaded into the organic phase, and also to supply sufficient sulphate ions to cause the precipitation of the excess aqueous calcium ions. After mixing for 45 min, the system contained copious gypsum solids which were consequently removed via settling and filtration to yield a clear solution free of solids.

A sample of the magnesium loaded organic formed previously was contacted with the above clarified solution at an organic to aqueous ratio of ≈2.5:1 for 2 min at ≈40° C. During mixing, most calcium ions that loaded in the first stage were replaced by magnesium ions.

After mixing, both phases separated within 60 seconds. The scrubbed magnesium loaded organic was transparent and free of third phase formation. The aqueous phase was initially totally clear. However, after one minute of standing gypsum began to precipitate as a result of displacing calcium ions from the organic phase.

A sample of the resulting magnesium loaded organic was removed and stripped with a solution containing ≈255 g/L HCl and ≈2.15 M $MgCl_2$ such that the amount of HCl added was in 4% excess to ensure complete magnesium and calcium stripping. Stripping produced a mixture of saturated magnesium chloride brine and $MgCl_2.6H_2O_{(S)}$ crystals. Each product was analysed and found to have a magnesium to calcium mole ratio of ≈2,827:1 and ≈17,773:1 respectively.

Example 4

This example illustrates calcium loading the extractant IONQUEST 801 using Method A. A calcium chloride/calcium carbonate slurry was used for loading calcium into the extractant.

A sample of 16.7 wt % IONQUEST 801 in Exxsol D80 (diluent) was contacted with an aqueous slurry composed of ≈10.2 wt % $CaCl_2$ and ≈1.7 wt % $CaCO_{3(S)}$ at an organic to aqueous ratio of ≈2.8:1 for 5 min at ≈30° C. During mixing, carbon dioxide gas was liberated.

After mixing, both phases separated within 30 seconds. The aqueous phase contained only trace amounts of residual solids and was totally clear. The pH of the resulting aqueous solution was 2.23. The calcium loaded organic phase containing ≈2.7 g/L of calcium was transparent and free of third phase formation.

Example 5

This example illustrates calcium loading the extractant DEHPA using Method A. A calcium chloride/calcium carbonate slurry was used for loading calcium into the extractant.

A sample of 17.7 wt % DEHPA in Exxsol D80 (diluent) was contacted with an aqueous slurry composed of ≈9.7 wt % $CaCl_2$ and ≈1.7 wt % $CaCO_{3(S)}$ at an organic to aqueous ratio of ≈2.8:1 for 5 min at ≈28° C. During mixing, carbon dioxide gas was liberated.

After mixing, both phases separated within 60 seconds. The aqueous phase contained only trace amounts of residual solids and was totally clear. The pH of the resulting aqueous solution being was 2.62. The calcium loaded organic phase containing ≈2.7 g/L of calcium was transparent and free of third phase formation.

Example 6

This example illustrates use of calcium loaded IONQUEST 801 to extract ferric ions from an aqueous solution containing $Fe^{+3}$, $Al^{+3}$, $Zn^{+2}$ and $Cu^{+2}$ ions. The iron loaded organic extractant was then stripped with a mixture of HCl and $FeCl_3$ solution. The product is suitable for further processing, for example via spray pyrolysis.

An aqueous solution containing 388 mg/L $Fe^{+3}$, 339 mg/L $Al^{+3}$, 131 mg/L $Cu^{+2}$ and 20.4 mg/L $Zn^{+2}$ as, sulphates, and ≈100 mg/L of sulphuric acid, was used.

A sample of 10 wt % IONQUEST 801 in Exxsol D80 (diluent) was calcium loaded to give 1,560 mg/L of calcium ions. This sample was contacted with the above aqueous solution at a temperature of 13° C. for 2 min using an aqueous to organic ratio of ≈5:1.

After mixing, both phases separated within 30 seconds. The aqueous phase was totally clear and found to have a pH of 1.73. The organic phase was transparent and free of third phase formation.

One portion of the loaded organic extractant was removed and stripped with excess concentrated HCl to ensure near complete metal stripping. Consequently, the loaded organic extractant was found to contain 2,690 mg/L $Fe^{+3}$, 14.7 mg/L $Al^{+3}$, 37.4 mg/L $Zn^{2+}$, 0.7 mg/L $Cu^{+2}$ and 9.6 mg/L $Ca^{+2}$ ions. Therefore, greater than 99% of the calcium ions initially present in the organic phase were exchanged for other metal ions, primarily ferric ions.

Another portion of the loaded organic extractant was removed and contacted with an aqueous strip solution containing initially ≈0.5 M $FeCl_3$ and ≈3.5 M HCl at an organic to aqueous ratio of ≈1:1 for 10 min. The resulting organic phase was then stripped again as described above and found to contain only 674 mg/L of residual ferric ions. Therefore, ≈75% of the iron had been stripped by the $FeCl_3$/HCl mixture. The mixture is suitable for downstream purification and processing, for example via spray pyrolysis.

Example 7

This example illustrates calcium loading of the extractant 2-hexyldecanoic acid (2-HDA) by leaching (pre-dissolving) $Ca(OH)_{2(S)}$ using a triethanolamine buffer, followed by the use of the calcium loaded organic to extract various metal ions from aqueous solution.

Calcium Loading 2-HDA using Method B

An aqueous solution containing ≈0.74 M triethanolamine hydrochloride buffer and ≈0.48 M $CaCl_2$ has a pH of 5.57 at ambient temperature. $Ca(OH)_{2(S)}$ was added to form a slurry initially containing ≈1.43 wt % solids. Since the buffer was in its acidic form, leaching of $Ca(OH)_{2(S)}$ ensued.

After 5 min of agitation, nearly all of the introduced solids had dissolved, leaving behind a minor amount of unreacted solids which was subsequently removed by filtration. The pH of the clarified solution was 7.42.

A sample of 15 wt % 2-HDA in Exxsol D80 (diluent) was contacted with the clarified solution at an organic to aqueous ratio of ≈2.45:1 for 2 min at ambient temperature.

After mixing, both phases separated within 30 seconds. The aqueous phase remained totally clear and was found to have a pH of 5.47. The calcium loaded organic phase containing 2,810 mg/L of calcium ions was transparent and free of third phase formation.

Extraction of Various Metal Ions from Aqueous Solution

An aqueous solution containing 3,020 mg/L $Ni^{+2}$, 153 mg/L $Co^{+2}$, 142 mg/L $Cu^{+2}$, 166 mg/L $Mn^{+2}$, 59.8 mg/L $Zn^{+2}$ and 0.41 M $Mg^{+2}$ ions, mostly as sulphates, has a pH of 5.00.

A sample of the calcium loaded organic extractant formed above was contacted with the aqueous solution at ambient temperature for 5 min using an organic to aqueous ratio of ≈1:1.

After mixing, both phases separated within 60 seconds. The aqueous phase was totally clear and found to have a pH of 6.44. 8 minutes after standing, the aqueous phase began to precipitate gypsum solids as a result of the calcium introduced via the exchange process. The organic phase was transparent blue-green and free of third phase formation.

Analysis of the aqueous phase found it to contain 258 mg/L $Ni^{+2}$, 27.8 mg/L $Co^{+2}$, 0.6 mg/L $Cu^{+2}$, 66.3 mg/L $Mn^{+2}$, 1.4 mg/L $Zn^{+2}$ and ≈0.40 M $Mg^{+2}$ ions. Percent extractions were calculated and found to be Ni 91.46%, Co 81.83%, Cu 99.58%, Mn 60.06%, Zn 97.66%, and Mg 1.66%.

Example 8

This example illustrates magnesium loading of the extractant 2-hexyldecanoic acid (2-HDA) by leaching (pre-dissolving) $MgO_{(S)}$ using a triethanolamine buffer, followed by the use of the magnesium loaded organic to extract various metal ions from aqueous solution.

Magnesium Loading 2-HDA using Method B

An aqueous solution containing ≈0.74 M triethanolamine hydrochloride buffer and ≈0.48 M $MgCl_2$ has a pH of 6.65 at ambient temperature. $MgO_{(S)}$ was added to form a slurry initially containing ≈0.75 wt % solids. Since the buffer was in its acidic form, leaching of $MgO_{(S)}$ ensued.

After 25 min of agitation, nearly all of the introduced solids had dissolved, leaving behind a minor amount of unreacted solids which was subsequently removed by filtration. The pH of the clarified solution was 7.60.

A sample of 15 wt % 2-HDA in Exxsol D80 (diluent) was contacted with the clarified solution at an organic to aqueous ratio of ≈2.14:1 for 2 min at ambient temperature.

After mixing, both phases separated within 30 seconds. The aqueous phase remained totally clear and was found to have a pH of 6.53. The magnesium loaded organic phase containing 1,490 mg/L of magnesium ions was transparent and free of third phase formation.

Extraction of Various Metal Ions from Aqueous Solution

An aqueous solution containing 3,020 mg/L $Ni^{+2}$, 153 mg/L $Co^{+2}$, 142 mg/L $Cu^{+2}$, 166 mg/L $Mn^{+2}$, 59.8 mg/L $Zn^{+2}$ and 0.41 M $Mg^{+2}$ ions mostly as sulphates, has a pH of 5.00.

A sample of the magnesium loaded organic extractant formed above was contacted with the aqueous solution at ambient temperature for 5 min using an organic to aqueous ratio of $\approx$1:1.

After mixing, both phases separated within 30 seconds. The aqueous phase was totally clear and found to have a pH of 6.18. The organic phase was transparent blue-green and free of third phase formation.

Analysis of the aqueous phase found it to contain 340 mg/L $Ni^{+2}$, 29.2 mg/L $Co^{+2}$, <0.6 mg/L $Cu^{+2}$, 82.1 mg/L $Mn^{+2}$ and 1.6 mg/L $Zn^{+2}$. Percent extractions were calculated and found to be Ni 88.74%, Co 80.91%, Cu>99.60%, Mn 50.54%, and Zn 97.32%.

Example 9

This example illustrates calcium loading of a mixture of the chelating extractant LIX 84-I and the organic acid extractant 2-hexyldecanoic acid by leaching (pre-dissolving) $Ca(OH)_{2(S)}$ using an ammonium buffer as in Method B.

An aqueous solution containing $\approx$0.26 M ammonium chloride buffer and $\approx$10.3 wt % $CaCl_2$ has a pH of 4.56 at ambient temperature. $Ca(OH)_{2(S)}$ was added to form a slurry initially containing $\approx$0.65 wt % solids. Since the buffer is in its acidic form, leaching of $Ca(OH)_{2(S)}$ ensued.

After 5 min of agitation all of the introduced solids had dissolved, yielding a clear solution with a strong ammonia smell. The pH of the solution was =8.69.

A sample of 12 wt % LIX 84-I, 10 wt % 2-HDA in Shellsol 2046 (diluent) was contacted with the above solution at an organic to aqueous ratio of $\approx$1.2:1 for 2 min at ambient temperature.

Alter mixing, both phases separated within 60 seconds. The aqueous phase remained totally clear and was found to have a pH of 6.02, with the smell of ammonia no longer present. The calcium loaded organic phase containing $\approx$2.72 g/L of calcium ions was transparent light brown and free of third phase formation.

Example 10

This example illustrates the use of a calcium loaded organic mixture of chelating extractant LIX 84-I and the organic acid extractant 2-hexyldecanoic acid to extract nickel ions from a concentrated chloride solution.

An aqueous solution of 5M $CaCl_2$ containing 4,520 mg/L of nickel ions serves as the source of nickel ions for the extraction.

A sample of 18.1 wt % LIX 84-I and 9.3 wt % 2-HDA in Shellsol 2046 (diluent) was calcium loaded to the extent of containing $\approx$2.62 g/L of calcium ions.

The calcium loaded organic phase was contacted with the aqueous solution at an organic to aqueous ratio of $\approx$1:1 for 10 min at ambient temperature.

After mixing, both phases separated within 2 min. The aqueous phase was transparent light green and found to have a pH of 1.76. The organic phase was very dark green and free of third phase formation.

A sample of the nickel loaded organic phase was removed and acid stripped using excess 0.5 M sulphuric acid to ensure near complete stripping Subsequently, the loaded organic was found to contain 3,990 mg/L of nickel ions and 14.4 mg/L of calcium ions. Therefore, greater than 99.4% of the calcium ions initially present in the organic phase were displaced while aiding the loading of nickel ions into the organic phase.

Example 11

This example illustrates the use of calcium loaded LIX 84-I to selectively extract copper ions from a concentrated chloride solution which also contains zinc ions.

An aqueous solution of 5M $CaCl_2$ containing $\approx$210 mg/L of copper ions and $\approx$440 mg/L of zinc ions was used as the source of copper ions for the extraction. This solution appeared bright light green due to the interaction between the copper and chloride ions.

A sample of 16.4 wt % LIX 84-I and 9.0 wt % dodecanol (modifier) in Shellsol 2046 (diluent) was calcium loaded to the extent of containing $\approx$1.50 g/L of calcium ions.

The calcium loaded organic phase was contacted with the aqueous solution for 10 minutes using an aqueous to organic ratio of $\approx$12.8:1 at ambient temperature.

After mixing, both phases separated within 2 min. The aqueous phase was totally clear and was found to have a pH of 1.77. Analysis of the aqueous phase found it to contain $\approx$13 mg/L of copper ions and $\approx$440 mg/L of zinc ions. The organic phase was very dark green and free of third phase formation.

A sample of the copper loaded organic phase was removed and acid stripped using excess strong acid to ensure near complete stripping. Subsequently, the loaded organic phase was found to contain the balance of copper ions, >2 mg/L of the zinc ions and 6.0 mg/L of calcium ions. Therefore, greater than 99.5% of the calcium ions initially present in the organic phase were exchanged for copper ions.

Although the invention has been described by way of example, it should be appreciated that variations and modifications may be made without departing from the scope of the invention. Furthermore, where known equivalents exist to specific features, such equivalents are incorporated as if specifically referred to in this specification.

What is claimed:

1. A process for preparing an extractant solution where the extractant solution is a solution of a calcium ion or magnesium ion loaded extractant in a water-immiscible organic solvent, and where the extractant solution is suitable for extracting metal ions from an aqueous solution containing the metal ions, including the steps:
    a) mixing an aqueous solution of calcium ions or magnesium ions with a basic calcium salt or a basic magnesium salt and with a solution of an organic extractant in a water-immiscible organic solvent to form the extractant solution; and
    b) separating the extractant solution from the aqueous solution.

2. A process as claimed in claim 1 wherein the basic calcium salt is calcium oxide, calcium hydroxide, or calcium carbonate.

3. A process as claimed in claim 1 wherein the basic magnesium salt is magnesium oxide, magnesium hydroxide, magnesium carbonate, hydrated magnesium carbonate, basic magnesium carbonate, or dolomite.

4. A process as claimed in claim 1 wherein the extractant solution is a solution of a magnesium ion loaded extractant in a water-immiscible organic solvent.

5. A process as claimed in claim 4 wherein the magnesium is recovered from the extractant solution by treatment with aqueous hydrochloric acid to give a solution of magnesium chloride.

6. A process as claimed in claim 5 wherein the solution of magnesium chloride is substantially free of any non-magnesium metal ions.

7. A process as claimed in claim 1 wherein the aqueous solution of calcium ions or magnesium ions of step a) is a solution of magnesium chloride.

8. A process as claimed in claim 7 wherein the aqueous solution of magnesium chloride additionally contains sulphate ions.

9. A process as claimed in claim 8 wherein the sulphate ions are obtained from magnesium sulphate and/or sulphuric acid.

10. A process as claimed in claim 1 further including the steps:
   c) contacting the extractant solution with an aqueous solution containing metal ions to give a solution of the extractant loaded with some or all the metal ions and to give an aqueous solution containing some or all the calcium ions or magnesium ions; and
   d) separating the aqueous solution from the solution of the extractant loaded with some or all the metal ions.

11. A process as claimed in claim 10 wherein some or all the metal ions are recovered from the solution of the extractant loaded with some or all the metal ions.

12. A process as claimed in claim 1 wherein a pH buffer is added to the aqueous solution and/or solution of the organic extractant during step a).

13. A process as claimed in claim 12 wherein the buffer is acetic acid, a mono or diamine, an alkanolamine, or an amino acid.

14. A process as claimed in claim 1 wherein the organic extractant is a carboxylic acid, an hydroxy oxime, or an organo-phosphorous acid.

15. A process as claimed in claim 14 wherein the carboxylic acid is naphthenic acid, versatic acid, (Z)-9-octadecenoic acid, isostearic acid, 2-octyl-dodecanoic acid, 2-hexyl-decanoic acid, or 2-butyl-octanoic acid.

16. A process as claimed in claim 14 wherein the hydroxy oxime is 2-hydroxy-5-nonylacetophenone oxime, 5-dodecylsalicylaldoxime, or 5-nonylsalicylaldoxime.

17. A process as claimed in claim 14 wherein the organo-phosphorous acid is di-(2-ethylhexyl)phosphoric acid, 2-ethylhexyl phosphonic acid mono-2-ethylhexyl ester, or bis(2,4,4-trimethylpentyl)phosphinic acid.

18. A process as claimed in claim 1 wherein the aqueous solution of calcium ions of step a) is formed from calcium chloride or calcium nitrate.

19. A process as claimed in claim 1 wherein the aqueous solution of magnesium ions of step a) is formed from magnesium nitrate, magnesium sulphate, or magnesium chloride.

* * * * *